(No Model.) 2 Sheets—Sheet 2.
J. W. STONE.
HOPPER AND MEANS FOR MOVING AND ELEVATING SAME.
No. 542,693. Patented July 16, 1895.
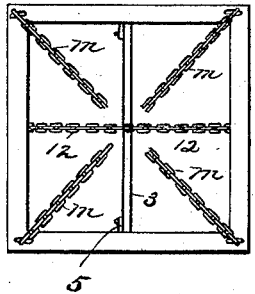
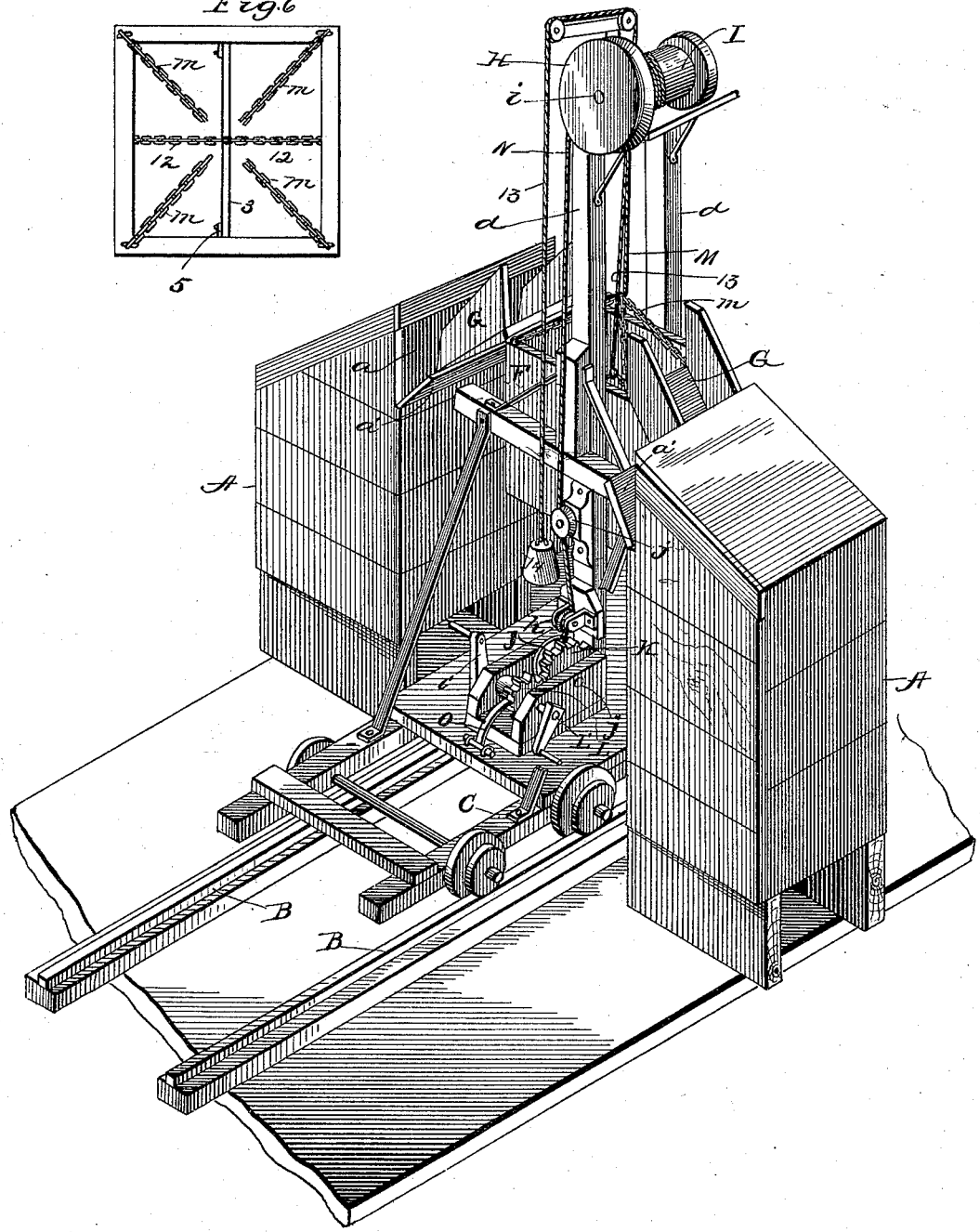
Witnesses
J. M. Fowler Jr.
L. Dorian
Inventor
John W. Stone
by Crosby and Dorian
his Attorneys.

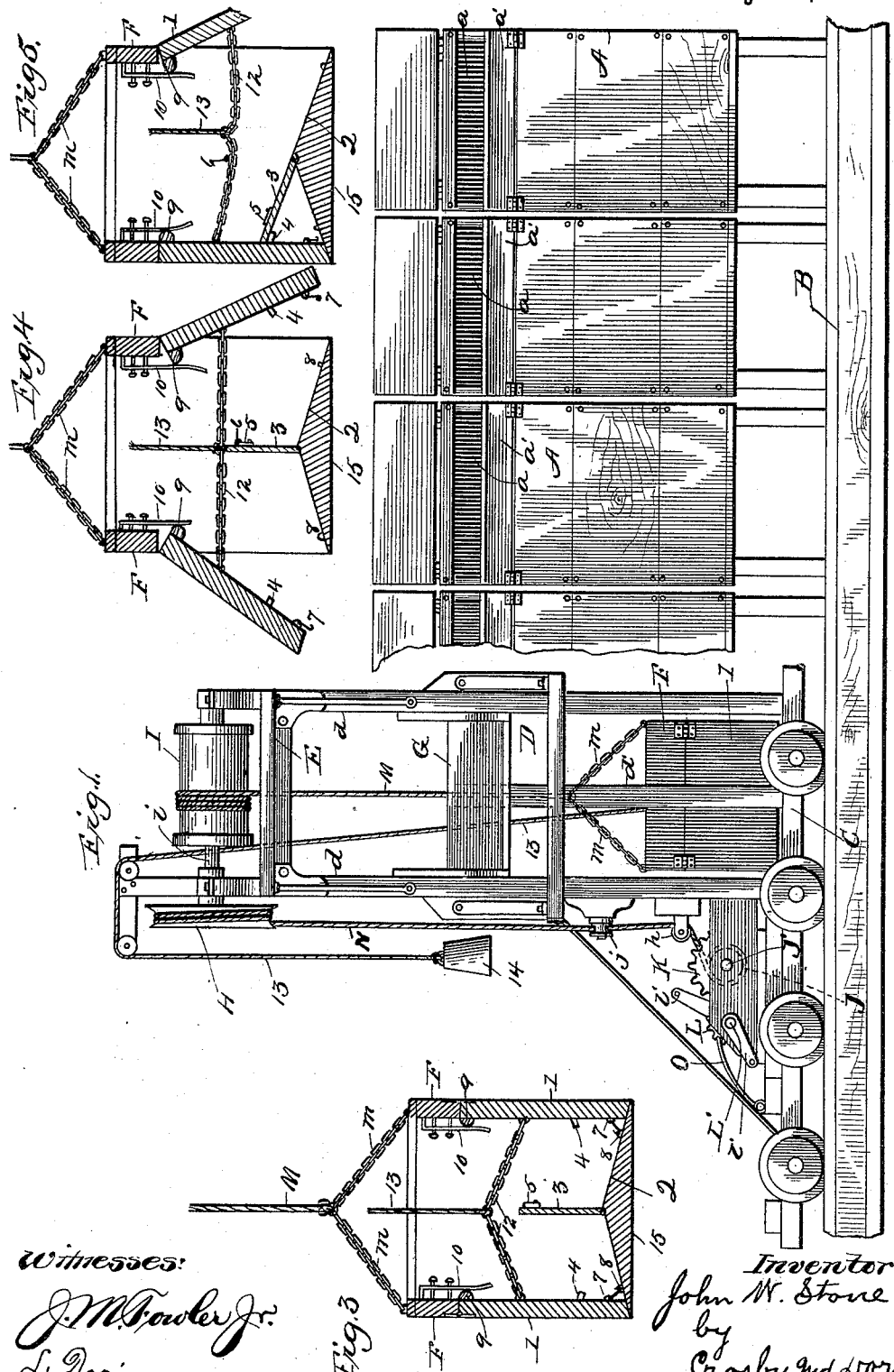

UNITED STATES PATENT OFFICE.

JOHN W. STONE, OF MERRILL, IOWA.

HOPPER AND MEANS FOR MOVING AND ELEVATING SAME.

SPECIFICATION forming part of Letters Patent No. 542,693, dated July 16, 1895.

Application filed March 16, 1895. Serial No. 542,019. (No model.)

*To all whom it may concern:*

Be it known that I, JOHN W. STONE, a citizen of the United States, residing at Merrill, in the county of Plymouth and State of Iowa, have invented certain new and useful Improvements in Hoppers and Means for Moving and Elevating the Same; and I do hereby declare the following to be a full, clear, and exact description of the invention, such as will enable others skilled in the art to which it appertains to make and use the same.

The first part of this invention relates to a hopper of peculiar construction, designed to be filled with corn or other articles, and to be elevated with its contents, and to discharge the said contents automatically into cribs or other receptacles provided for the same when it has reached a certain predetermined height.

The second part of the invention relates to the means by which the hopper and its contents are moved from the place where it receives its load to a place adjacent to the cribs or receptacles to be filled, and then elevated into position to discharge its contents into said cribs or receptacles.

The general object of the invention is to provide a means by the use of which the operation of loading corn, wheat, oats, or other grain into cribs, or coal or other articles into receptacles provided for them, is greatly facilitated and cheapened.

Specific objects are, first, to provide a hopper which is of simple and cheap construction, and designed to be elevated with its contents to a certain predetermined height and automatically to discharge its contents when it has reached said height; second, to provide such a hopper with means whereby its contents may be discharged either into both of two cribs or receptacles simultaneously or into either one of said cribs or receptacles at the will of the operator; third, to provide the gate of a hopper with means whereby it will be held in open position during the operation of unloading the hopper; fourth, to provide novel means for closing the gates of the hopper when the contents of the latter have been discharged; fifth, to provide an elevating mechanism for the hopper which will be of simple and cheap construction, easily operated, and of great power, whereby a minimum amount of physical force will be sufficient to elevate a large quantity of corn, &c.

To these ends the invention consists in certain peculiarities in the construction, arrangement, and combination of the several parts, substantially as hereinafter described, and particularly pointed out in the subjoined claims.

In the accompanying drawings illustrating the invention, Figure 1 is a view of a single row of corn-cribs and a side elevation of my novel machine for receiving the corn from a wagon and for carrying it to and depositing it within the desired crib, the hopper of the machine being shown in position to receive its load. Fig. 2 is a perspective view of my improved machine arranged between two cribs so as to be capable of discharging its contents into both of the same, said hopper being shown partly elevated. Fig. 3 is a sectional representation of the hopper detached from the balance of the machine, showing the same closed. Fig. 4 is a similar representation of the hopper with both side gates open and the interior gate vertical so as to discharge its contents into two opposite cribs. Fig. 5 is a similar view of the hopper, showing the arrangement of the gates when the hopper is to discharge into but one crib; and Fig. 6 is a plan view of the hopper.

The same letters and figures of reference designate the same parts in the several views.

The cribs A have openings $a$, with inclined boards $a'$ adjacent to said openings, which boards may be hinged to form closures for said openings or not, whichever is preferred. Said cribs are arranged in two parallel rows of any desired length, and between said rows are tracks B, upon which travels a car C, that supports my improved carrier and elevator. Erected upon said car is a suitable frame D, surmounted by a braced platform E. Between the uprights $d\ d'$ of said frame D is a vertically-movable hopper or elevator car F, the construction of which forms one of the principal features of my invention. It consists of a box of suitable shape and capacity, open at the top and closed at the bottom. Two opposite sides of this box are formed with openings, which are normally closed by gates 1, that are hinged at their tops and open outward, as clearly shown in Fig. 4. The bottom 2 of the hopper is constructed to form two inclined planes, which direct the corn toward the lower ends of the gates and cause it to exert a pressure upon said gates, which tends to open them. In order to keep the gates shut until the hopper has arrived at the place where it will discharge its contents into the desired cribs, and to permit said gates to open automatically by the weight of the contents of the hopper when the latter has reached a proper height, the uprights $d$ of the frame are in substantially-close frictional contact with the sides of the hopper that are provided with the gates, so as to resist the pressure of the corn upon said gates, and terminate at the height at which the hopper is to discharge its contents into the cribs. At the upper ends of the posts $d$ are chutes G, which direct the corn onto the inclined gates or boards $a'$ of the cribs, from which gates or boards the corn falls into the cribs through the openings $a$ in the latter, as is obvious.

To the end that the hopper may be caused to discharge into either one of two cribs, when it is not desired to fill both cribs at once, a gate 3 is provided within the interior of the hopper. The lower end of this gate is located contiguous to the junction of the two inclined planes forming the bottom 2 of the hopper, and said gate is hinged or pivoted at its said lower end, so that it may be turned into inclined position to either side of the hopper, thereby closing one side of the hopper and causing the corn to be discharged only through the other side thereof. It will be observed that the angle of inclination of the gate 3, when it is in inclined position, is such as to cause it to form a continuation of the inclined plane of the bottom of the hopper, so that all of the contents of the latter will be discharged into one crib. If preferred, the gate 3 may be secured to a shaft journaled in the ends of the hopper and having a handle by which it may be operated from the outside of the latter. When said gate 3 is inclined, its free end rests upon a lug 4, one of which projects inward from the inner surface of each gate 1, and said gate is held rigidly in vertical position by a hook 5, hinged to its upper end and intended to engage a perforation 6, formed in the side of the hopper. Either or both gates may be locked in closed position by hooks 7, engaging rings 8, but I do not consider this essential.

To facilitate discharge of the corn by overcoming any tendency the gates might have to close or press upon the corn being discharged, I preferably employ curved castings 9, secured to the inner surfaces of the upper ends of the gates 1, and springs 10, secured at their upper ends to the rigid parts of the sides of the box or hopper and pressing at their lower ends upon the curved surfaces of said castings with a force which holds the gates open. These springs preferably have their upper extremities rigidly secured, and at proper distances from their upper ends are formed with perforations through which headed pins 11 loosely extend, as this construction increases their effectiveness.

Connected with both gates 1 is a cable or chain 12, to which is secured one end of a line 13, said line extending upward over suitable pulleys and thence downward to within reach of the operator. The free end of said line 13 is preferably provided with a weight 14, which serves to keep the line taut and thereby prevents it from becoming entangled in the hoisting or other mechanism.

The hoisting mechanism devised by me embraces three drums or spools, H, I, and J, a gear-wheel K, a pinion L, and cables or chains M and N. The drums H and I are mounted on a common shaft $i$, journaled in bearings supported by the platform E, and drum H is of considerably greater diameter than drum I. Upon the latter drum is wound the cable M from which the hopper depends, said cable being connected by the inclined branches $m$ with the four corners of the hopper. To the larger drum H is secured one end of the cable N, said cable being wound several times around said drum and extending thence to and around drum J, to which latter drum its other end is secured, and it engages properly-arranged pulleys, as $h$ and $j$, between said drums. Said drum J is mounted upon a shaft J', to which the gear-wheel K is fixed, and said gear-wheel is intermeshed with a pinion L, which is mounted upon a shaft L' having operating cranks $l'$ at its ends.

It will be seen that motion in a certain direction applied or communicated to shaft L' will be transmitted to shaft $i$ through drums H and J and cable N, and that cable M will thereby be wound upon drum I, thus elevating hopper F. During the ascent of said hopper cable N will be wound from drum H onto drum J. The hopper is held in elevated position during the discharge of its contents by engaging a pawl O with pinion L. To permit the hopper to descend, the gates 1 thereof are closed by pulling downward upon rope 13, and pawl O is disengaged from pinion L; and during such descent of the hopper, cable N is unwound from drum J and wound upon drum H. To permit the hopper to descend by gravity its bottom is weighted, as indicated at 15.

At one end of the rows of cribs there is preferably a pit into which my device is run, said pit having a chute P, so that the corn may be dumped direct from the wagon into the hopper. The device is then pushed or pulled to the required crib or cribs to be filled, and the hopper is elevated, its contents discharged, and it is then lowered, all in the manner above described, and the device is then run back to the pit to receive another load.

Practical experience has demonstrated that a carrier and elevator constructed as above described is easily operated and of great power, so that one man can accomplish with it the work of many men by the old method of shoveling the corn from wagons or the ground into the cribs. It, furthermore, is of simple and cheap construction. While I have described it as a device for handling corn, it is, obviously, equally as well adapted for handling grain of any kind and for handling coal or other articles of merchandise.

I do not wish to be understood as limiting myself to the specific construction herein described, as many of the details of construction may be varied without departing from the spirit of the invention.

Having now described my invention, what I claim is—

1. In a corn elevator, the combination of a vertically movable hopper, for receiving the corn and depositing it in a crib, said hopper having an inclined bottom and a hinged gate, and a post engaging said gate and holding the same closed, said post terminating at the height at which the contents of the hopper are to be discharged, substantially as described.

2. In a corn elevator, the combination of the vertically-movable hopper, having its bottom formed of two inclined planes and its sides provided with hinged gates, and posts engaging said gates and holding the same closed, said posts terminating at the height at which the contents of the hopper are to be discharged.

3. The combination of the body of a hopper, having an inclined surface for directing the contents thereof toward the discharge opening, a gate for closing said discharge opening, means for holding said gate normally closed, and a spring tending to open said gate.

4. In a corn elevator, the combination with the vertically-movable hopper, having its bottom formed of two inclined planes and its sides provided with hinged gates, and a pivoted gate within said hopper, of posts engaging said first-mentioned gates and terminating at the height at which the contents of the hopper are to be discharged.

5. A hopper, having its bottom formed of a plurality of inclined planes and its sides provided with hinged gates having projections extending from their inner surfaces, and a pivoted gate within said hopper, adapted to be adjusted into either vertical or inclined position, said gate resting upon one of said projections when inclined, and a spring tending to open said gate substantially as described.

6. A hopper, having an inclined bottom, a hinged gate in its side provided at its hinged end with a projection having a curved surface, and a spring engaging said curved surface of the gate and serving to hold the gate open, substantially as described.

7. In a corn elevator, the combination with the vertically movable hopper, having its bottom inclined and its side provided with a hinged gate, said gate having a curved projection at its hinged end, and a spring engaging the curved surface of the projection and serving to hold the gate open, of a post engaging said gate and holding the same closed, said post terminating at the height at which the contents of the hopper are to be discharged, and a rope connected to said gate for closing the same when the hopper has unloaded its contents, substantially as described.

8. In a corn elevator, the combination with a shaft, two drums of different diameters mounted thereon, a cable engaging the smaller drum, and the elevating hopper secured to said cable, of a third drum, a cable secured at its end to said larger and third drums, a gear wheel mounted upon the shaft of said third drum, a pinion meshed with said gear, operating cranks at the ends of the shaft of said pinion, and a pawl for engaging said pinion, substantially as described.

In testimony whereof I affix my signature in presence of two witnesses.

JOHN W. STONE.

Witnesses:
T. E. STONE,
L. E. LAMBERT.